United States Patent
Juttu et al.

(10) Patent No.: US 7,029,650 B1
(45) Date of Patent: Apr. 18, 2006

(54) PROCESS FOR MAKING A GERMANIUM-ZEOLITE

(75) Inventors: Gopalakrishnan G. Juttu, Sugar Land, TX (US); Alla Konstantin Khanmamedova, Sugar Land, TX (US); Scott F. Mitchell, The Woodlands, TX (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 11/023,099

(22) Filed: Dec. 27, 2004

(51) Int. Cl.
  *C01B 39/36* (2006.01)
(52) U.S. Cl. ............... 423/705; 423/707; 423/713; 423/DIG. 22
(58) Field of Classification Search ............... 423/705, 423/707, DIG. 22, 713
  See application file for complete search history.

(56) References Cited

U.S. PATENT DOCUMENTS

| | | | | |
|---|---|---|---|---|
| 5,371,307 | A * | 12/1994 | Guth et al. ............... | 585/250 |
| 6,784,333 | B1 * | 8/2004 | Juttu et al. ............... | 585/419 |
| 2002/0001564 | A1 * | 1/2002 | Vitale-Rojas et al. ....... | 423/713 |
| 2004/0042958 | A1 * | 3/2004 | Canos et al. ............... | 423/718 |
| 2004/0171477 | A1 * | 9/2004 | Canos et al. ............... | 502/60 |
| 2004/0220045 | A1 * | 11/2004 | Mathieu et al. ............... | 502/60 |

OTHER PUBLICATIONS van de Water et al., "Ge-ZSM-5: the Simultaneous Incorporation of Ge and Al into ZSM-5 Using Parallel Synthesis Approach," J. Phys. Chem. B, 107, pp. 10423-10430, 2003.*
Kosslick et al., "Synthesis and Characterization of Ge-ZSM-5 Zeolites," J. Phys. Chem., 97, 5678-5684, 1993.*
Tuilier et al., "EXAFS Study of Germanium-Rich MFI-Type Zeolites," ZEOLITES, 11, 99, 662-665, 1991.*
Carey, Organic Chemistry, p. 863, 1987.*

* cited by examiner

*Primary Examiner*—David Sample
(74) *Attorney, Agent, or Firm*—Jim D. Wheelington

(57) ABSTRACT

This invention relates to a process for making a germanium-zeolite. The zeolite is preferably a MFI-type structure, most preferably a ZSM-5 MFI zeolite. The germanium-zeolite is synthesized from an aqueous gel containing a silica source, a germanium source, an aluminum source and a structure directing agent in the presence of an acid to control the pH of the gel in the range of 6.5 to 13.5, preferably 7.5 to 11, to maximize the amount of germanium incorporated into the zeolite framework. Optionally, a sodium compound may be introduced into the reaction mixture gel either before or after the addition of the acid, preferably before.

25 Claims, 1 Drawing Sheet

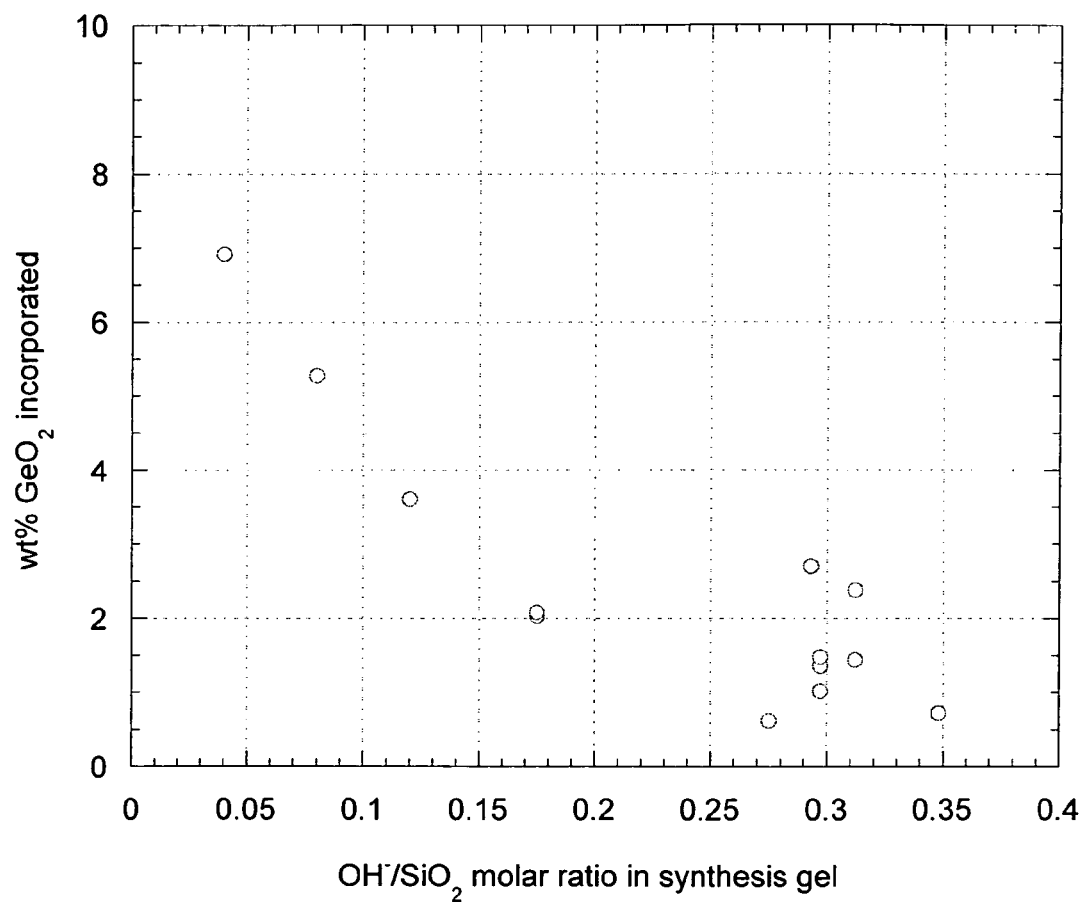
FIGURE

PROCESS FOR MAKING A GERMANIUM-ZEOLITE

BACKGROUND OF THE INVENTION

1. Field of the Invention:

This invention relates to a process for making a zeolite, preferably a MFI-type structure, most preferably a ZSM-5 MFI zeolite, having germanium in the framework (hereinafter referred to as "Ge-zeolite" or, if the zeolite is ZSM-5 MFI, Ge-ZSM-5). This Ge-zeolite may be synthesized with or without using fluoride compounds.

2. Description of the Prior Art:

Zeolite is a crystalline hydrated aluminosilicate that may also contain other metals, such as sodium, calcium, barium, and potassium, and that has ion exchange properties (Encarta® World English Dictionary [North American Edition] © & (P) 2001 Microsoft Corporation). A method for preparing a zeolite comprises (a) preparing an aqueous mixture of silicon oxide and sources of oxides of aluminum; and (b) maintaining said aqueous mixture under crystallization conditions until crystals of said zeolite form.

Synthetic zeolites are normally prepared by crystallization of zeolites from a supersaturated synthesis mixture. The resulting crystalline product is then dried and calcined to produce a zeolite powder. The zeolite powder may be bound for use in certain equipment and process, e.g. fluidized bed reactor.

Synthesis of a MFI-type zeolite with germanium in the framework is disclosed in "Synthesis and Characterization of Ge-ZSM-5 Zeolites, H. Kosslick et al., J. Phys. Chem., vol. 97, p. 5678–5684 (1993). Hydrofluoric acid (HF) is used in the synthesis.

U.S. Pat. No. 5,391,287 discloses a crystalline zeolite SSZ-35 prepared with a particular templating agent. In the discussion of the background, it is noted that organocations (organic amines and quaternary ammonium cations) exert influence on the zeolite crystallization process by affecting the characteristics of the synthesis gel, e.g. modifying the gel pH. SSZ-35 may contain germanium. There is no disclosure on the effect of the pH of the synthesis gel on incorporation of germanium in the zeolite framework.

U.S. Pat. No. 5,073,673 discloses a process for the production of high-octane gasoline using a crystalline aluminogallosilicate obtained by hydrothermally treating a homogeneous aqueous mixture containing a source of silica, a source of alumina and a source of gallia and having a pH of 8–13 at a temperature of 150°–250° C. with stirring until crystals of said aluminogallosilicate are formed. The particle size of the aluminogallosilicate depends on factors such as the kind of the silica source, the amount of organic additives (e.g. quaternary ammonium salt), the amount and kind of the inorganic salt to be used as a mineralizer, the amount of base in the gel, the pH of the gel, the temperature of the crystallization and the rate of stirring. By appropriately controlling these conditions, crystalline aluminogallosilicate having a particle size of about 0.05–20 micron with at least 80% by weight thereof having a particle size of 0.01–10 micron may be produced. Germanium is listed as one of over thirty auxiliary components.

U.S. Pat. No. 4,923,594 discloses a fluid catalytic cracking process with a fluid catalytic cracking catalyst of a microporous crystalline multi-compositional, multiphase composite of SAPO-37 non-zeolitic molecular sieve and a zeolitic molecular sieve. Recipes calling for pHs of 12 or higher, e.g., sodium hydroxide as a reagent, are not desirable due to decomposition of the substrate. A lower pH is obtained by using ammonium salts as substitutes for some of the caustic. The initial gel pH of the non-zeolitic molecular sieve is weakly acidic to facilitate incorporation of the hydrolyzable metal cation form of the elements into the frameworks, and inhibiting their precipitation as hydroxides or oxides. In Example 1 the pH of the zeolitic molecular sieve was initially 4.9 and raised to 7.2. Germanium is listed as one of approximately 14 elements capable of forming a framework tetrahedral oxide in the non-zeolitic molecular sieve.

It would be advantageous to have a process for making a germanium zeolite-type catalyst in which did the amount of germanium incorporated into the framework could be controlled and maximized.

SUMMARY OF THE INVENTION

This invention provides a process for synthesizing a zeolite containing aluminum, silicon and germanium in the framework. The zeolite structure may be of MFI, FAU, TON, MFL, VPI, MEL, AEL, AFI, MWW or MOR, but preferably, the zeolite has a MFI structure, more preferably is ZSM-5 MFI zeolite. The Ge-zeolite is synthesized from an aqueous gel containing a silica source, a germanium source, an aluminum source and a structure directing agent in the presence of an acid, such as sulfuric acid, acetic acid, nitric acid, phosphoric acid, hydrofluoric acid or formic acid, to control the pH of the gel in the range of 5.25 to 13.5, preferably 7.5 to 11 to maximize the amount of germanium incorporated into the zeolite framework. The reaction mixture gel is heated and stirred to form zeolite crystals and then cooled. The zeolite crystals are separated from the gel and are washed, dried and calcined.

BRIEF DESCRIPTION OF THE DRAWINGS

A more complete appreciation of the invention and many of the attendant advantages thereof will be readily understood by reference to the following detailed description when considered in connection with the accompanying drawings:

FIGURE is a plot of the amount of germanium incorporated by weight percent versus the molar ratio of hydroxyl to alumina in the synthesis gel.

DETAILED DESCRIPTION OF THE INVENTION

Zeolites are known to be crystallized silicates and include structures of $TO_4$ tetrahedra, which form a three dimensional network by sharing oxygen atoms where T represents tetravalent elements, such as silicon, and trivalent elements, such as aluminum. Zeolites generally crystallize from an aqueous solution. The typical technique for synthesizing zeolites comprises converting an aqueous gel of a silica source, a germanium source and an aluminum source to zeolite crystals by a hydrothermal process, employing a dissolution/recrystallization mechanism. The reaction medium also contains structuring agents which are incorporated in the microporous space of the zeolite network during crystallization, thus controlling the construction of the network and assisting to stabilize the structure through the interactions with the zeolite components. The reaction takes place in the presence of an acid, such as sulfuric acid, acetic acid, nitric acid, phosphoric acid, hydrofluoric acid, hydrochloric acid or formic acid.

The Ge-zeolite is synthesized from an aqueous gel containing a silica source, a germanium source, an aluminum source and a structure directing agent.

An example of the silica source is silicon oxide or silica ($SiO_2$) which is available in various forms, such as silica sol, commercially available as Ludox AS-40™, precipitated silica, commercially available as Ultrasil VN3SP™ and fumed silica, commercially available as Aerosil 200™.

Examples of the aluminum source are sodium aluminate, aluminum nitrate, aluminum sulfate and pseudobohemite.

Examples of the germanium source are germanium oxide, germanium isopropoxide, germanium chloride and sodium germanate.

Examples of the structure directing agent are tetra n-propyl ammonium hydroxide, tetra n-propyl ammonium bromide and tetra n-propyl ammonium chloride.

The initial pH of the reaction mixture is controlled to a range of 5.25 to 13.5, preferably 7.5 to 11. The final pH may be increase by 0.5 to 1.6 over the initial pH. The control of the pH of the gel is accomplished by the addition of an acid. The acid may be either organic or inorganic. Examples without limitation of the acids are hydrochloric acid, hydrofluoric acid, sulfuric acid, acetic acid, nitric acid, phosphoric acid and formic acid.

The reaction mixture is heated for crystallization of the zeolite. The temperature is in the range of 100° C. to 200° C. During heating, the reaction mixture may be stirred, agitated or static. The reaction mixture is cooled to room temperature. The zeolite crystals are separated from the gel by cooling, filtering, water washing and/or drying. The liquid portion of the gel may be removed by filtration, evaporation, spray drying or any other means for removing water from zeolite crystals. The zeolite crystals are washed with deionized water at ambient temperature, preferably 0° C. to 50° C., until the pH of the filtrate is approximately 7.5. The zeolite crystals are dried in air at 90° C. to 110° C. for four to twenty-four hours, preferably approximately six hours. The zeolite crystals may be calcined in air at 400° C. to 600° C., preferably approximately 550° C. for three to ten hours, preferably approximately six hours.

Optionally, a sodium compound may be introduced into the reaction mixture gel. Examples of the sodium compound are sodium chloride, sodium nitrate, sodium sulfate, sodium hydroxide or sodium germanate (which is also a germanium source). The sodium compound may be introduced either before or after the addition of the acid, preferably before.

The gel may be "aged" before adjustment of the pH by addition of an acid. The time between forming the reaction mixture gel by combining a silica source, a germanium source, an aluminum source, a structure directing agent and water and adding the acid ("aging") may be in the range of 0 to 24 hours, preferably 1 to 15 hours. If the gel is aged, the pH may be lower than that for a non-aged gel after addition of the same amount of acid.

The silicon to aluminum atomic ratio (Si:Al) of the MFI zeolite is preferably greater than 10:1, more preferably in the range from 20:1 to 200:1, and most preferably in the range from 25:1 to 100:1. The silica to germania ratio is present preferably in the range from 100:1 to 8:1, more preferably in the range from 50:1 to 10:1 and most preferably in the range from 25:1 to 10:1.

The zeolite has average pore size preferably in the range from 2 angstroms to 100 angstroms, more preferably in the range from 2 angstroms to 50 angstroms and most preferably in the range of 2 angstroms to 20 angstroms.

Noble metals, such as platinum, may be deposited on the Ge-zeolite (hereinafter referred to at Pt/Ge-zeolite or, if the zeolite is ZSM-5 MFI, Pt/Ge-ZSM-5). Pt/Ge-zeolite may be calcined to make a Pt/Ge-zeolite catalyst which may be used in a process for aromatization of alkanes having two to six carbon atoms per molecule to aromatics, such as benzene, toluene and xylene. The Pt/Ge-zeolite may be calcined in air at 200° to 500°, preferably approximately 300° for one to six hours, preferably approximately four hours. Before or after deposition of the noble metal, the zeolite may be bound by oxides of magnesium, aluminum, titanium, zirconium, thorium, silicon, boron and mixtures thereof. The process steps of binding, depositing a noble metal and calcining of the zeolite alone, with binder or with noble metal deposit can occur in any order.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

$GeO_2/Al_2O_3$=2.47 and $OH^-/Al_2O_3$=6.0

0.8 g of $GeO_2$ was dissolved in solution of NaOH (1.22 g) in D.I. water (15.02 g). The sodium-germanate solution was added to Ludox AS-40 (45.63 g) and stirred for 10 minutes. Dissolve 0.55 g of sodium aluminate (57% $Al_2O_3$, 35% $Na_2O$, 8% $H_2O$) in 18.61 g of D.I. water. Sodium-aluminate solution was added to previous mixture and stirred for 10 minutes. 31.9 g of tetrapropyl ammonium hydroxide (40% TPAOH and 60% $H_2O$) and 46.23 g of D.I. water were added to the previous mixture. Synthesis mixture was stirred for about 1–1.5 hours, then 9.72 g of acetic acid diluted in water (50/50 wt.) was added. The measured pH was 10.54.

Hydrothermal static synthesis continued for 36 hours at 160° C. Then sample was filtered, washed with 1 L of D.I. water, dried at 90° C. and calcined in air at 300° C. for 3 hours and 550° C. for 6 hours at temperature ramp 2°/min.

EXAMPLE 2

$GeO_2/Al_2O_3$=10 and $OH^-/Al_2O_3$=12.4

3.22 g of $GeO_2$ and 3.71 g NaOH in 35.0 g of D.I. water. Sodium-germanate solution was added to Ludox AS-40 (45.68 g). Gel was formed and stirred for 15 minutes. For preparation of sodium-aluminate solution 0.55 g of sodium aluminate was dissolved in 10.0 g of D.I. water. After stirring for 10 minutes clear solution was obtained. Sodium-aluminate solution was added to previous mixture and stirred for 10 minutes. 32.0 g of tetrapropyl ammonium hydroxide was introduced to the previous mixture. Synthesis mixture was stirred for about 1–1.5 hours, then 14.86 g of acetic acid diluted in water (50/50 wt.) was added and measured pH was 10.46.

Hydrothermal synthesis with stirring (60 rpm) continued for 36 hours at 160° C. Then sample was filtered, washed with 1 L of D.I. water, dried at 90° C. and calcined in air at 300° C. for 3 hours and 550° C. for 6 hours at temperature ramp 2°/min.

EXAMPLE 3

$GeO_2/Al_2O_3=10$ and $OH^-/Al_2O_3=7.9$

For preparation of sodium-germanate solution was used 3.22 g of $GeO_2$ and 3.70 g NaOH in 45.0 g of D.I. water. Sodium-germanate clear solution was added to Ludox AS-40 (45.67 g). Gel was formed and stirred for 15 minutes. For preparation of sodium-aluminate solution 0.55 g of sodium aluminate was dissolved in 18.1 g of D.I. water. After stirring for 10 minutes clear solution was obtained. Sodium-aluminate solution was added to previous mixture and stirred for 10 minutes. 32.0 g of tetrapropyl ammonium hydroxide and 23.0 g of D.I. water were introduced to the previous mixture. Synthesis mixture was stirred for about 15 hours, then 16.5 g of acetic acid diluted in water (50/50 wt.) was added. After stirring for 2.5 hours pH was 8.82.

Hydrothermal synthesis with stirring (60 rpm) continued for 36 hours at 160° C. Then sample was filtered, washed with 2 L of D.I. water, dried at 90° C. and calcined in air at 300° C. for 3 hours and 550° C. for 6 hours at temperature ramp 2°/min.

EXAMPLE 4

$GeO_2/Al_2O_3=10$ and $OH^-/Al_2O_3=6.0$

For preparation of sodium-germanate solution was used 3.22 g of $GeO_2$ and 3.71 g NaOH in 45.0 g of D.I. water. Sodium-germanate clear solution was added to Ludox AS-40 (45.67 g). Gel was formed and stirred for 15 minutes. For preparation of sodium-aluminate solution 0.55 g of sodium aluminate was dissolved in 18.0 g of D.I. water. After stirring for 10 minutes clear solution was obtained. Sodium-aluminate solution was added to previous mixture and stirred for 10 minutes. 32.0 g of tetrapropyl ammonium hydroxide and 23.0 g of D.I. water were introduced to the previous mixture. Synthesis mixture was stirred for about 15 hours, then 17.25 g of acetic acid diluted in water (50/50 wt.) was added. After stirring for 0.5 hours pH was 6.61.

Hydrothermal synthesis with stirring (60 rpm) continued for 36 hours at 160° C. After cooling down pH of material was 8.08. Material was washed on filter with 2 L of D.I. water, dried at 90° C. and calcined in air at 300° C. for 3 hours and 550° C. for 6 hours at temperature ramp 2°/min.

EXAMPLE 5

$GeO_2/Al_2O_3=10$ and $OH^-/Al_2O_3=8.7$

For preparation of sodium-germanate solution was used 3.22 g of $GeO_2$ and 2.44 g NaOH in 45.0 g of D.I. water. Sodium-germanate clear solution was added to Ludox AS-40 (45.65 g). Gel was formed and stirred for 15 minutes. For preparation of sodium-aluminate solution 0.55 g of sodium aluminate was dissolved in 18.0 g of D.I. water. After stirring for 10 minutes clear solution was obtained. Sodium-aluminate solution was added to previous mixture and stirred for 10 minutes. 32.0 g of tetrapropyl ammonium hydroxide and 32.0 g of D.I. water were introduced to the previous mixture. Synthesis mixture was stirred for 1 hour, then 6.23 g of glacial acetic acid was added. After stirring for 10 minutes pH was 10.64.

Hydrothermal synthesis with stirring (300 rpm) continued for 36 hours at 160° C. After cooling down pH of material was 10.77. Material was washed on filter with 2 L of D.I. water, dried at 90° C. and calcined in air at 300° C. for 3 hours and 550° C. for 6 hours at temperature ramp 2°/min.

EXAMPLE 6

$GeO_2/Al_2O_3=10$ and $OH^-/Al_2O_3=7.0$

For preparation of sodium-germanate solution was used 3.22 g of $GeO_2$ and 2.44 g NaOH in 45.0 g of D.I. water. Sodium-germanate clear solution was added to Ludox AS-40 (45.67 g). Gel was formed and stirred for 15 minutes. For preparation of sodium-aluminate solution 0.55 g of sodium aluminate was dissolved in 18.0 g of D.I. water. After stirring for 10 minutes clear solution was obtained. Sodium-aluminate solution was added to previous mixture and stirred for 10 minutes. 32.0 g of tetrapropyl ammonium hydroxide and 32.0 g of D.I. water were introduced to the previous mixture. Synthesis mixture was stirred for 1 hour, then 6.55 g of glacial acetic acid was added. After stirring for 10 minutes pH was 10.06.

Hydrothermal synthesis with stirring (300 rpm) continued for 36 hours at 160° C. After cooling down pH of material was 10.41. Material was washed on filter with 2 L of D.I. water, dried at 90° C. and calcined in air at 300° C. for 3 hours and 550° C. for 6 hours at temperature ramp 2°/min.

EXAMPLE 7

$GeO_2/Al_2O_3=10$ and $OH^-/Al_2O_3=5.0$

For preparation of sodium-germanate solution was used 3.22 g of $GeO_2$ and 2.44 g NaOH in 45.0 g of D.I. water. Sodium-germanate clear solution was added to Ludox AS-40 (45.67 g). Gel was formed and stirred for 15 minutes. For preparation of sodium-aluminate solution 0.55 g of sodium aluminate was dissolved in 18.0 g of D.I. water. After stirring for 10 minutes clear solution was obtained. Sodium-aluminate solution was added to previous mixture and stirred for 10 minutes. 32.0 g of tetrapropyl ammonium hydroxide and 32.0 g of D.I. water were introduced to the previous mixture. Synthesis mixture was stirred for 1 hour, then 6.91 g of glacial acetic acid was added. After stirring for 10 minutes pH was 9.59.

Hydrothermal synthesis with stirring (300 rpm) continued for 36 hours at 160° C. After cooling down pH of material was 10.43. Material was washed on filter with 2 L of D.I. water, dried at 90° C. and calcined in air at 300° C. for 3 hours and 550° C. for 6 hours at temperature ramp 2°/min.

COMPARATIVE EXAMPLE (No acid added)

Prepared the solutions as shown below:
- Solution #1: Dissolved 4.08 g sodium hydroxide in 45.26 g of DI water. Added 2.31 g of $GeO_2$ and stirred until a clear homogeneous solution was obtained.
- Solution #2: Dissolved 0.76 g sodium aluminate (57 wt % $Al_2O_3$, 35 wt % $Na_2O$ and 8 wt % $H_2O$) in 25.13 g DI water.
- Solution #3: Diluted 40.43 g of 40 wt % TPAOH solution with 58.37 g of DI water.

Added solution #1 to 57.20 g of colloidal silica sol (Ludox AS-40) and stirred well into a homogeneous white gel. Added solution #2 and stirred well. Added solution #3. Loaded the gel into a PTFE lined autoclave and synthesized at 160° C. for 36 hours under constant agitation. Filtered the zeolite and calcined in an oven with air flow at 550° C. for 6 hours.

Each of the zeolites from the Examples above was analyzed by X-ray fluorescence spectroscopy to determine content for silicon, aluminum, sodium and germanium.

TABLE 1

Elemental Analysis

| | Si (wt %) | Al (wt %) | Na (wt %) | Ge (wt %) |
|---|---|---|---|---|
| Example #1 | 43.80 | 0.80 | — | 2.07 |
| Example #2 | 37.99 | 0.68 | 2.11 | 8.95 |
| Example #3 | 38.02 | 0.68 | 0.91 | 8.40 |
| Example #4 | 38.95 | 0.67 | 0.66 | 8.29 |
| Example #5 | 38.40 | 0.70 | 1.07 | 7.99 |
| Example #6 | 36.36 | 0.67 | 0.82 | 7.52 |
| Example #7 | 39.47 | 0.70 | 0.62 | 7.37 |
| Comparative Example | 43.94 | 1.08 | | 0.44 |

As shown by the data above, controlling the pH in a range from 5.25 to 13.5 increases the incorporation of germanium in the zeolite framework. These data also demonstrate the advantages of the presence of a sodium compound in the incorporation of germanium.

Numerous modifications and variations of the present invention are possible in light of the above teachings. It is to be understood that, within the scope of the appended claims, the invention may be practiced other than as specifically described.

What is claimed as new and desired to be secured by Letter of Patent of the United States of America is:

1. A process for synthesizing an aluminum-silicon-germanium zeolite comprising:
   a) forming a reaction mixture gel by combining a silica source, a germanium source, an aluminum source, a structure directing agent and water;
   b) introducing an acid to adjust pH to 5.25 to 13.5;
   c) introducing a sodium compound into the reaction mixture gel before or after introduction of the acid;
   d) heating the reaction mixture gel to form zeolite crystals;
   e) cooling the gel;
   f) separating the zeolite crystals from the gel;
   g) washing the zeolite crystals;
   h) drying the zeolite crystals; and
   i) calcining the zeolite crystals.

2. The process as in claim 1 wherein the pH is between 7.5 and 11.

3. The process as in claim 1 wherein the reaction mixture gel is heated to a temperature in the range of 100° C. to 200° C.

4. The process as in claim 1 wherein the gel is cooled to room temperature.

5. The process as in claim 1 wherein the zeolite crystals are separated by filtration.

6. The process as in claim 1 wherein washing is with deionized water at 0° C. to 50° C. until the pH of the filtrate is approximately 7.5.

7. The process as in claim 1 wherein the zeolite crystals are dried in air at 90° C. to 110° C. for four to twenty-four hours.

8. The process as in claim 1 wherein the zeolite crystals are calcined in air at 400° C. to 600° C. for three to ten hours.

9. The process as in claim 1 wherein the gel is aged for 0 to 24 hours before the acid is added to adjust pH.

10. The process as in claim 9 wherein the gel is aged for 1 to 15 hours.

11. The process as in claim 1 wherein the sodium compound is introduced before introduction of the acid.

12. The process as in claim 11 wherein the sodium compound is sodium chloride, sodium nitrate, sodium sulfate, sodium hydroxide or sodium germanate.

13. The process as in claim 1 wherein the silica source is silicon oxide (silica).

14. The process as in claim 13 wherein the silica source is silica sol, precipitated silica or fumed silica.

15. The process as in claim 1 wherein the aluminum source is sodium aluminate, aluminum nitrate, aluminum sulfate or pseudobohemite.

16. The process as in claim 1 wherein the germanium source is germanium oxide, germanium isopropoxide, germanium chloride or sodium germanate.

17. The process as in claim 1 wherein the structure directing agent is tetra n-propyl ammonium hydroxide, tetra n-propyl ammonium bromide or tetra n-propyl ammonium chloride.

18. The process as in claim 1 wherein the acid is sulfuric acid, acetic acid, hydrochloric acid, hydrofluoric acid, nitric acid, phosphoric acid or formic acid.

19. The process of claim 1 wherein the zeolite has an MFI, FAU, TON, MFL, VPI, MEL, AEL, AFI, MWW or MOR structure.

20. The process of claim 19 wherein the zeolite has an MFI structure and a silicon to aluminum atomic ratio greater than 10:1.

21. The process of claim 20 wherein the silicon to aluminum atomic ratio is in the range of from 20:1 to 200:1.

22. The process of claim 21 wherein the silicon to aluminum atomic ratio is in the range of from 25:1 to 100:1.

23. The process of claim 19 wherein the zeolite has an MFI structure and a silica to germania ratio is in the range of from 100:1 to 8:1.

24. The process of claim 23 wherein the silica to germania ratio is in the range of from 50:1 to 10:1.

25. The process of claim 24 wherein the silica to germania ratio is in the range of from 25:1 to 10:1.

* * * * *